United States Patent
Guo et al.

(10) Patent No.: US 10,051,093 B2
(45) Date of Patent: Aug. 14, 2018

(54) HARDWARE ACCELERATOR FOR PACKET CLASSIFICATION

(71) Applicant: Fortinet, Inc., Sunnyvale, CA (US)

(72) Inventors: Zhi Guo, San Jose, CA (US); John A. Cortes, Santa Clara, CA (US)

(73) Assignee: Fortinet, Inc., Sunnyvale, CA (US)

( * ) Notice: Subject to any disclaimer, the term of this patent is extended or adjusted under 35 U.S.C. 154(b) by 608 days.

(21) Appl. No.: 14/642,617

(22) Filed: Mar. 9, 2015

(65) Prior Publication Data

US 2016/0269511 A1    Sep. 15, 2016

(51) Int. Cl.
 *H04L 29/06* (2006.01)
 *H04L 29/08* (2006.01)
 *H04L 12/851* (2013.01)
 *H04L 12/721* (2013.01)

(52) U.S. Cl.
 CPC .......... *H04L 69/22* (2013.01); *H04L 47/2441* (2013.01); *H04L 67/2842* (2013.01); *H04L 45/38* (2013.01)

(58) Field of Classification Search
 CPC ..................... H04L 67/2842; H04L 69/22
 See application file for complete search history.

(56) References Cited

U.S. PATENT DOCUMENTS

| | | | | |
|---|---|---|---|---|
| 6,754,662 B1* | 6/2004 | Li | ...................... | G06F 17/30949 707/693 |
| 2012/0137075 A1* | 5/2012 | Vorbach | ................... | G06F 9/526 711/122 |
| 2013/0239193 A1* | 9/2013 | Bouchard | .............. | H04L 67/327 726/7 |

OTHER PUBLICATIONS

Jiang, W. et al., "Scalable Packet Classification: Cutting or Merging?" Ming Hsieh Department of Electrical Engineering University of Southern California. 6 pgs.

Amir, H. et al., "Packet Classification Algorithm Based on Geometric Tree by using Recursive Dimensional Cutting (DimCut)." Research Journal of Recent Sciences. ISSN 2277-2502. vol. 2(8), 31-39, Aug. 2013.

Ahl, Josephine., "A new Cutting Algorithm for the Packet Classification Problem—UpperCuts." Master's Thesis. Lulea University of Technology. May 2008. 53 pgs.

Sing, S. et al., "Packet Classification Using Multidimensional Cutting." 12 pgs.

(Continued)

*Primary Examiner* — Oussama Roudani
(74) *Attorney, Agent, or Firm* — Hamilton, DeSanctis & Cha LLP

(57) ABSTRACT

Systems and methods for packet classification hardware acceleration are provided. According to one embodiment, a packet classification hardware accelerator system includes multiple packet classification hardware units, a memory and a cache subsystem. The packet classification hardware units are each capable of operation in parallel on a corresponding decision tree of multiple decision trees that have been derived from respective subsets of a common ruleset defining packet classification rules based on header fields of packets. The memory has stored therein non-leaf nodes, leaf nodes and rules associated with the decision trees. The cache subsystem is coupled in communication with packet classification hardware units and the memory and has stored therein (i) a cached portion of the non-leaf nodes distributed among multiple non-leaf node caches, (ii) a cached set of the leaf nodes in a leaf node cache and (iii) a cached set of the rules.

10 Claims, 10 Drawing Sheets

(56) References Cited

OTHER PUBLICATIONS

Zhou, S. et al., "High-Performance Packet Classification on GPU." Ming Hsieh Department of Electrical Engineering. University of Southern California. 6 pgs.

Al-Mamory, S. et al., "Taxonomy of Packet Classification Algorithms." Journal of Babylon University. Pure and Applied Sciences. No. 7. vol. 21. 2013. 12 pgs.

* cited by examiner

HARDWARE ACCELERATOR FOR PACKET CLASSIFICATION

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2015, Fortinet, Inc.

BACKGROUND

Field

Embodiments of the present invention generally relate to packet classification. More particularly, embodiments of the present invention relate to packet classification using a hardware accelerator that enables scalable, fast, and efficient packet/network traffic classification/analysis.

Description of the Related Art

Access control, traffic engineering and intrusion detection, among other network security services, seek to protect Internet-connected users/devices from threats posed by malicious users. Such security services typically require discrimination/filtering of packets based on multiple fields of the packets. This process is typically referred to as packet classification. A classifier, using a set of filters or rules, specifies the flows, or classes. For example, each rule in a firewall might specify a set of source and destination addresses and associate a corresponding deny or permit action. Alternatively, the rules might be based on several fields of a packet header potentially spanning multiple layers of the OSI model and each of which may contain addressing and protocol information. Firewalls perform packet classification and filtering to secure a private network or computer. Firewalls may be implemented as hardware devices, as a software application or a combination of hardware and software. Regardless of the implementation, the firewall is logically situated between the external network and the protected network. For example, the firewall may be located between a private network and the Internet to protect the private network from intrusion through the Internet connection. A packet-filtering network security device, such as a firewall, uses a packet filter to inspect each Internet Protocol (IP) packet or datagram entering or leaving the network. A packet is accepted or rejected based on a set of user-defined rules. A packet filter intercepts each data packet and compares each packet to the set of rules before the packet is forwarded to its destination. The comparison may be implemented by comparing various IP packet header fields to values in a look-up table, for example. The relevant packet header field(s) are compared to values in the look up table until either a matching rule is found, or until no match is found and a default rule is selected. Typically, the comparison performed by the packet filter involves one or more of the source address, the source port, the destination address, the destination port and the transport protocol.

On some types of proprietary hardware, an Access Control List (ACL) refers to rules that are applied to port numbers or network daemon names that are available on a host or layer 3 device, each with a list of hosts and/or networks permitted to use a service. Both individual servers as well as routers can have network ACLs. ACLs can be configured to control both inbound and outbound traffic.

In network communication, efforts to continuously improve the efficiency and security of network operation is an important goal for Internet users. Packet classification may distinguish or classify data packets based on multiple dimensions of information carried in packet headers, and thereby implement access control, traffic engineering, intrusion detection, and many other network services. More specifically, a network router may classify incoming packets into different flows and then to perform appropriate actions depending on the classification.

Major packet classification techniques known in the art can be broadly categorized into two approaches, namely, a ternary content addressable memory (TCAM) approach, and an algorithmic approach, wherein TCAMs allow use of wildcards in performing their matching, and thus are more flexible than binary content-addressable memories (CAMs). When a bank of TCAMs is properly programmed, the TCAMs are able to perform a match in a single lookup. However, TCAMs consume a lot of power, are of limited size, cost more than conventional memories, have high device cost, high energy cost, require ranges to be expressed using multiple TCAM entries, and poor scalability in terms of both rule set size and throughput.

The algorithmic approach, on the other hand, offers the advantage that decision-trees can be implemented through software. However, existing algorithmic approaches suffer from the disadvantage of requiring a large memory footprint and relatively low throughput.

There is therefore a need in the art for a low cost, high throughput, and scalable packet classification system that can improve the speed and efficiency of traffic flow through network devices.

SUMMARY

Systems and methods are described for packet classification hardware acceleration. According to one embodiment, a packet classification hardware accelerator system includes multiple packet classification hardware units, a memory and a cache subsystem. The packet classification hardware units are each capable of operation in parallel on a corresponding decision tree of multiple decision trees that have been derived from respective subsets of a common ruleset defining packet classification rules based on header fields of packets. The memory has stored therein non-leaf nodes, leaf nodes and rules associated with the decision trees. The cache subsystem is coupled in communication with packet classification hardware units and the memory and has stored therein (i) a cached portion of the non-leaf nodes distributed among multiple non-leaf node caches, (ii) a cached set of the leaf nodes in a leaf node cache and (iii) a cached set of the rules.

Other features of embodiments of the present invention will be apparent from the accompanying drawings and from the detailed description that follows.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DETAILED DESCRIPTION

Figure 1:
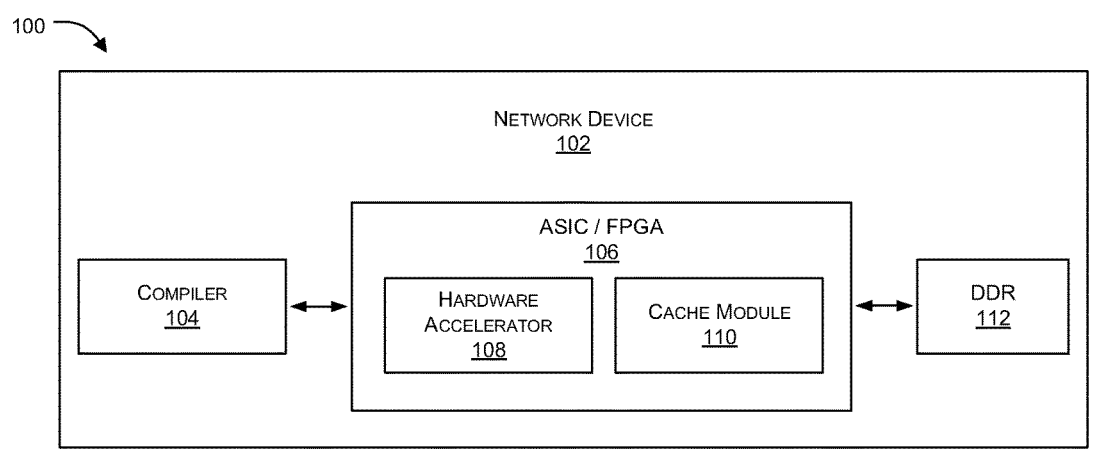
FIG. 1 illustrates an exemplary network device architecture in accordance with an embodiment of the present disclosure.

Systems and methods are described for packet classification hardware acceleration. Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

If the specification states a component or feature "may", "can", "could", or "might" be included or have a characteristic, that particular component or feature is not required to be included or have the characteristic.

Exemplary embodiments will now be described more fully hereinafter with reference to the accompanying drawings, in which exemplary embodiments are shown. This invention may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

In an aspect, packet classification hardware accelerator system of the present disclosure can include multiple packet classification hardware units (PCH Units), each capable of operation in parallel on a corresponding decision tree of multiple decision trees, wherein the decision trees are derived from respective subsets of a common ruleset defining packet classification rules based on header fields of packets. System of the present disclosure can also include a memory having stored therein non-leaf nodes, leaf nodes, and rules associated with the decision trees, and can further include a cache subsystem that is in communication with the PCH units and with the memory (e.g., an off-chip Double Data Rate (DDR) Synchronous Dynamic Random Access Memory (SDRAM)), having stored therein a cached portion of the non-leaf nodes distributed among multiple non-leaf node caches, a cached set of the leaf nodes in a leaf node cache, and a cached set of the rules.

According to one embodiment, each PCH unit can include multiple non-leaf node engines, a leaf node engine, and a rule engine, wherein the non-leaf node engines are operable to identify one or more leaf node indices based on an n-tuple input query and those of the non-leaf nodes of the corresponding decision tree. The leaf node engine can be operable to identify one or more rule indices based on the one or more identified leaf node indices and those of the leaf nodes of the corresponding decision tree. The rule engine can be operable to identify one or more matched rules based on the one or more identified rule indices and those of the rules of the corresponding decision tree.

According to one embodiment, system of the present disclosure can include a level-two (L2) cache shared among the non-leaf node caches. In another embodiment, system of the present disclosure can configure a compiler that marks each of the non-leaf nodes as either hot or cold, wherein those of the non-leaf nodes marked as cold are evicted from the non-leaf node cache and/or from the L2 cache before those of the non-leaf nodes marked as hot. In another aspect, only such non-leaf nodes that are marked as hot can be cached in the L2 cache.

In another aspect, a compiler performs decomposition and/or cutting of the common ruleset to generate the respective subsets, wherein the cutting of the common ruleset may be in one-dimension or multiple dimensions.

According to another embodiment, system of the present disclosure can also include a prioritization module that is configured to prioritize the one or more identified matched rule identifiers. In an aspect, the prioritization module can either be configured within each PCH unit or can be configured outside the same but operatively coupled with the corresponding PCH unit. In another aspect, pipelined processing of one or more input n-tuple queries can be facilitated by decoupling of the PCH units and the cache subsystem.

According to one embodiment of the present disclosure, each of the multiple decision trees can be traversed in parallel or can be traversed serially. According to another embodiment, the PCH units and the cache subsystem can be implemented within one or more of an Application Specific Integrated Circuit (ASIC) and a Field-Programmable Gate Array (FPGA).

According to one embodiment, aspects of the present disclosure include a method for conducting packet classification including the steps of storing within a memory: non-leaf nodes, leaf nodes, and rules associated with multiple decision trees, wherein the decision trees can be derived from respective subsets of a common ruleset defining packet classification rules based on header fields of packets. Method of the present disclosure can further include the step of caching, within an appropriate non-leaf node cache of the non-leaf node caches of a cache subsystem of the hardware accelerator, by a hardware accelerator, a subset of the non-leaf nodes that have been recently accessed from the memory by the hardware accelerator based on a decision tree with which the non-leaf nodes are associated. The method can further include the steps of caching, by the hardware accelerator, a subset of the leaf nodes that have been recently accessed from the memory within a leaf node cache of the cache subsystem, and caching, by the hardware accelerator, a subset of the rules that have been recently accessed from the memory within a rule cache of the cache subsystem.

A method of the present disclosure, in an implementation, can further include the step of receiving, by the hardware accelerator, an input n-tuple query for packet classification and selecting, by the hardware accelerator, a decision prioritization (DP) unit of multiple concurrently operable DP units of the hardware accelerator to process the input n-tuple query. Once a DP unit is selected, method of the present disclosure can include the step of identifying, by a non-leaf node engine of multiple non-leaf node engines of the selected DP unit, one or more leaf node indices based on the input n-tuple query and based on one or more of the non-leaf nodes associated with a first decision tree of the multiple decision trees. The method can further include the step of then identifying, by a leaf node engine of the selected DP unit, one or more rule indices based on the one or more identified leaf node indices and one or more of the leaf nodes associated with the first decision tree, and finally identifying, by a rule engine of the selected DP unit, one or more matched rules based on the one or more identified rule indices and based on one or more of the rules associated with the first decision tree.

FIG. 1 illustrates an exemplary network device architecture 100 in accordance with an embodiment of the present invention. Those skilled in the art will appreciate that architecture 100 is completely exemplary and alternative configurations/constructions are within the scope of the present disclosure. In the context of the present example, architecture 100 includes a network device 102 (e.g., a firewall, a classifier, a gateway, a switch, a router, among other network/security devices). Network device 102 includes a processor 106 (e.g., an Application-Specific Integrated Circuit (ASIC)-Field-Programmable Gate Array (FPGA) that is operatively coupled with a compiler 104 and a memory (e.g., DDR 112), wherein ASIC-FPGA 106 can include a hardware accelerator 108 and a cache memory 110 (including L1 and/or L2 caches, for instance). In an aspect, ASIC-FPGA 106 can be configured to receive and process/filter/screen one or more incoming packets (e.g., HTTP packets) from one or more clients based on one or more rules that are configured to define parameters/conditions based on which the packets should be allowed to pass through network device 102 or be blocked, quarantined and/or rejected.

According to one embodiment, instead of or in addition to ASIC-FPGA 106, network device 102 can include any or a combination of a processor, which may comprise a digital signal processor (DSP), a central processing unit (CPU), a microcontroller, a microprocessor, a microcomputer, or any other processing means known in the art. ASIC-FPGA 106 can further include or be operatively associated with a static read only memory and/or a dynamic main memory.

Compiler 104 may be configured to decompose/cut a rule set into different subsets in order to minimize rule duplication. Each rule subset can then be compiled into a decision tree, wherein the decision trees can then, in an exemplary aspect, be stored in the DDR memory 112. In one embodiment, compiler 104 compiles the whole rule set into three decision trees corresponding to say three rule subsets that the original rule set is decomposed into. Therefore, in such an implementation, for each incoming query/packet, there would be three decision trees to be traversed (in series or in parallel based the particular implementation) to identify the applicable rules to be applied. Those skilled in the art will appreciate that multiple decision trees can be configured and derived from respective subsets of a common ruleset defining packet classification rules based on header fields of the incoming packets/queries. In another aspect, compiler 104 can perform both decomposition and cutting of the common ruleset to generate the respective subsets, wherein the cutting of the common ruleset may be in one-dimension or multiple dimensions. In an exemplary implementation, compiler 104 may be configured to receive a set of rules, partition the rules set into multiple subsets and compile each subset of rules into a corresponding binary format of a decision tree. Compiler 104 can further be configured to store the binary format of the decision tree in a memory (e.g., DDR 112) of network device, and to communicate the binary format of the decision tree via an interface with hardware accelerator 108.

In another aspect, hardware accelerator 108 can include multiple packet classification hardware units (which may be referred to as PCH units hereinafter), wherein each unit is capable of operating in parallel on a corresponding decision tree of the multiple decision trees (created by compiler 104). In an embodiment, memory 112 can be configured to store therein non-leaf nodes, leaf nodes, and rules associated with the multiple decision trees. As mentioned above, each rule subset can be compiled to form a corresponding decision tree, wherein for each decision tree, non-leaf nodes, leaf nodes, and rules can be marked/stored in a manner to make their independent retrieval efficient and simple, i.e., the non-leaf nodes should be retrievable independent of the leaf nodes.

According to one embodiment, cache module 110 can include a cache subsystem that is coupled to and is in communication with each of the multiple PCH units and memory 112. Cache subsystem, also represented through 110, can store a cached portion of the non-leaf nodes distributed among multiple non-leaf node caches, a cached set of the leaf nodes in a leaf node cache, and a cached set of the rules. Such cached data can either be stored in a single cache or across multiple caches that are all operatively coupled with hardware accelerator 108 as well as with memory 112. In another aspect, ASIC/FPGA 106 can be associated with a level-two (L2) cache shared among the multiple non-leaf node caches.

According to another embodiment, each of the PCH units can include multiple non-leaf node engines that are operable to identify one or more leaf node indices based on an n-tuple input query and those of the non-leaf nodes of the corresponding decision tree, a leaf node engine operable to identify one or more rule indices based on the one or more identified leaf node indices and those of the leaf nodes of the corresponding decision tree, and a rule engine operable to identify one or more matched rules based on the one or more identified rule indices and those of the rules of the corresponding decision tree.

According to one embodiment, compiler 104 can mark each of the non-leaf nodes as either hot or cold, wherein the non-leaf nodes that are marked as cold can be evicted from the leaf node cache and from the L2 cache before those non-leaf nodes that are marked as hot. In another aspect, only those non-leaf nodes that are marked as hot can be cached in the L2 cache.

Figure 2:
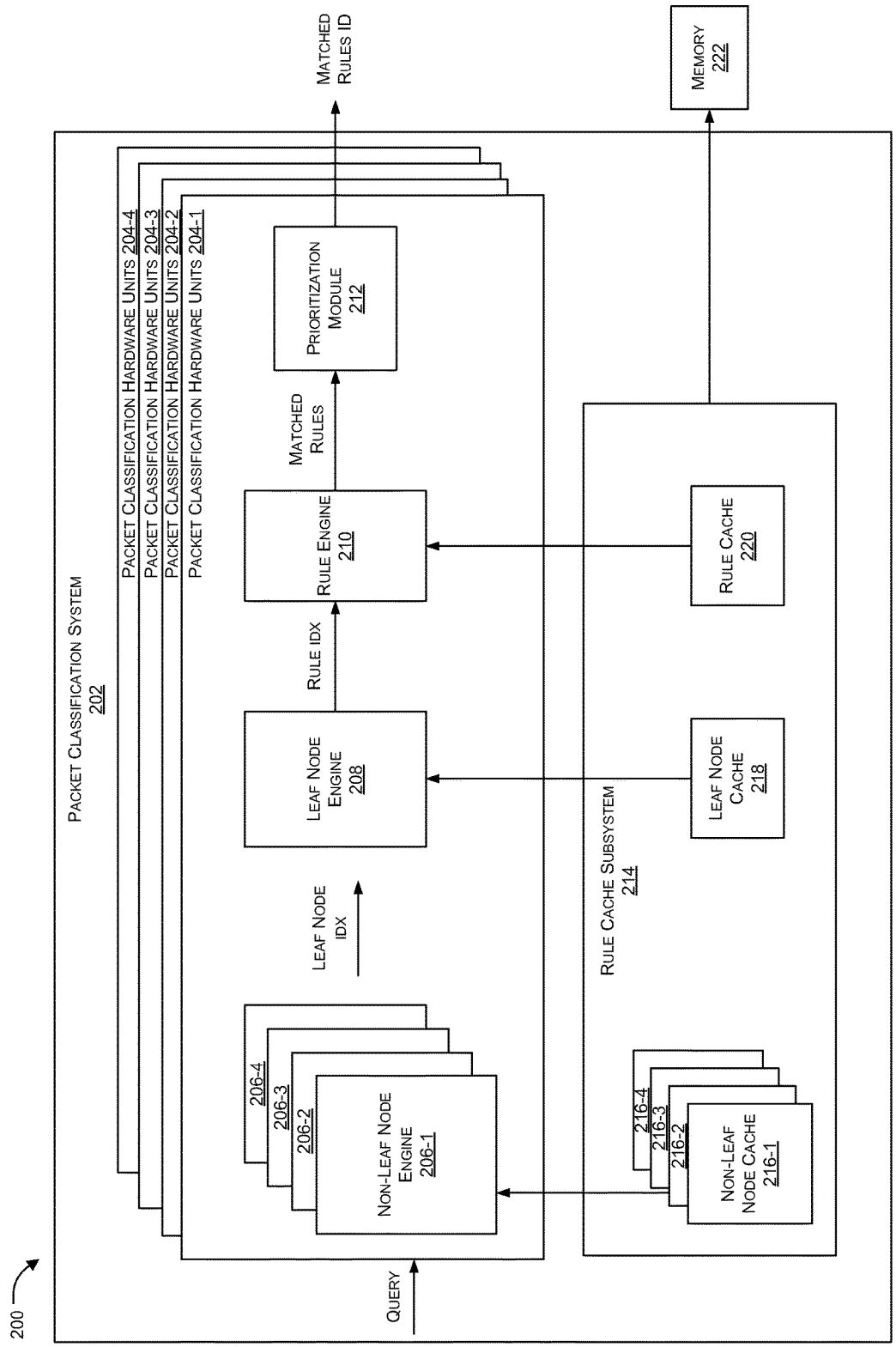
FIG. 2 illustrates an exemplary packet classification accelerator system in accordance with an embodiment of the present invention.

FIG. 2 illustrates a representation 200 showing an exemplary packet classification accelerator system 202 (which may also be interchangeably referred to as hardware accelerator 202) in accordance with an embodiment of the present invention. Hardware accelerator 202 can include multiple packet classification hardware units 204 (which may be referred to as PCH units 204 hereinafter) such as 204-1, 204-2, . . . , 204-n, wherein PCH units 204 may also be interchangeably referred to as decision prioritization (DP) units 204 hereinafter. Each PCH unit 204 can include one or more non-leaf engines such as 206-1, 206-2, and so on, a leaf node engine 208, a rule engine 210, and optionally a prioritization module 212 (which can also be configured outside of PCH unit 204 and be operatively coupled thereto).

In another aspect, hardware accelerator 202 can further include a cache subsystem 214 including one or more non-leaf node caches such as 216-1, 216-2, . . . , 216-n (which may be collectively referred to as 216 hereinafter), one or more leaf-node caches 218 (for illustration purposes only one cache 218 is shown), and one or more rule caches 220 (for illustration purposes only one cache 220 is shown). In an aspect, all non-leaf node engines 206 of a given PCH unit 204 can be configured to use one non-leaf node cache 216 in order to access non-leaf nodes of the one or more decision trees. For instance, considering that the main memory/DDR 222 of the system stores three decision trees, one or more non-leaf nodes of trees can be cached in cache 216 and can be referred to by non-leaf node engine 206. For instance, engine 206-1 of PCH unit 204-1 can be configured to process the first decision tree using cache 216-1, engine 206-2 of PCH unit 204-1 can be configured to process the second decision tree using the same cache 216-1, and engine 206-3 of PCH unit 204-1 can be configured to process the third decision tree using cache 216-3.

In an aspect, therefore, hardware accelerator 202 can include multiple PCH units 204, each capable of operating in parallel on a corresponding decision tree of multiple decision trees that are stored in memory 222, wherein the decision trees are derived from respective subsets of a common ruleset defining packet classification rules based on header fields of packets.

Memory 222 can be configured to store non-leaf nodes, leaf nodes and rules associated with the multiple decision trees, and cache subsystem 214, coupled in communication with multiple PCH units 204 and memory 222, stores a cached portion of the non-leaf nodes distributed among non-leaf node caches 216, a cached set of the leaf nodes in a leaf node cache 218, and a cached set of the rules 220. As also mentioned above, each PCH unit 204 can include one or more non-leaf node engines 206-1 that are operable to identify one or more leaf node indices based on an n-tuple input query and those of the non-leaf nodes of the corresponding decision tree and send the identified one or more leaf node indices to the leaf node engine 208. The leaf node engine 208 can be operable to identify one or more rule indices based on the one or more identified leaf node indices and those of the leaf nodes of the corresponding decision tree and send the identified one or more rule indices to rule engine 210, wherein rule engine 210 can be operable to identify one or more matched rules based on the one or more identified rule indices and those of the rules of the corresponding decision tree.

According to one embodiment, prioritization module 212 can be configured to prioritize the one or more identified matched rule identifiers and output matched rule identifiers. According to one embodiment, pipelined processing of one or more input n-tuple queries can be facilitated by decoupling PCH units 204 and cache subsystem 214. In another embodiment, PCH units 204 and cache subsystem 214 can be implemented within one or more of an ASIC and an FPGA.

According to one exemplary implementation, a host can store compiled decision trees (say three trees for instance) into a DDR memory such as 222, wherein at run-time, when a query (say a 5-tuple of a packet, for example) is received, one of the DP/PCH units 204 is assigned the query in a round-robin fashion, and traverses all three of the decision trees in parallel. Each of the DP unit's 204 non-leaf node engines 206 start from one decision tree's root node (a non-leaf node) by requesting the node from non-leaf cache 216. If the request results in a cache miss, cache system 216 can load it from DDR memory 222. At a certain point in the processing, the child node becomes a leaf node and the query is passed to leaf-node engine 208. Leaf engine 208, talking to its own cache 218, continues working on the decision tree at issue. Meanwhile, the same DP unit's non-leaf engine 206 can start working on the next query, if any. The whole procedure can therefore be pipelined. Leaf engine 208 can send pointers to rule engine 210. Rule engine 210 examines the 5-tuple against each of the rules and decides whether it's a match or not. All this packet's matched rule IDs can be sent to the prioritization module such as 212, wherein all of the matched IDs, or optionally only the top matched ID can be reported by prioritization module 212.

In one other embodiment, prioritization module 212 can be configured outside of DP units 204. Each packet's matched IDs can be consolidated and sent to prioritization module 212. In this manner, if the rule set is decomposed into more than the number of non-leaf engines 206 (four in FIG. 2), multiple DP units 204 can be configured to work on the same query in parallel. Furthermore, as shown in FIG. 2, all DP units' non-leaf node engine No. 0 (handling decision tree 0) use non-leaf cache No. 0. All DP units' non-leaf node engine No. 1 (handling decision tree 1) use non-leaf cache No. 1, so on and so forth. This way, node locality can be utilized efficiently.

In an aspect, hardware accelerator 202 has multiple packet classification hardware threads, and has a decoupled rule cache sub-system 214 available to such hardware threads, wherein the rule caches do not have to have a one-to-one association with a particular engine. Furthermore, in each engine thread, separated engines (non-leaf node engine 206, leaf node engine 208, and rule engine 210) can handle different types of nodes. In the cache sub-system 214, separated cache memories (non-leaf node cache 216, leaf node cache 218, and rule cache 220) hold different types of cached nodes. In cache sub-system 214, an L2 cache can be shared among one or more of or all of non-leaf node caches 216. In an embodiment, the compiler can mark each node as either a "hot" or "cold" node, wherein in the L1/L2 caches, cold nodes can be evicted before the hot nodes. In other embodiment, only hot nodes can stay in the L2. In another aspect, in the compiler, decomposition and cutting can be combined while the cutting could be in any order of one-dimensional and/or multi-dimensional.

Figure 3:
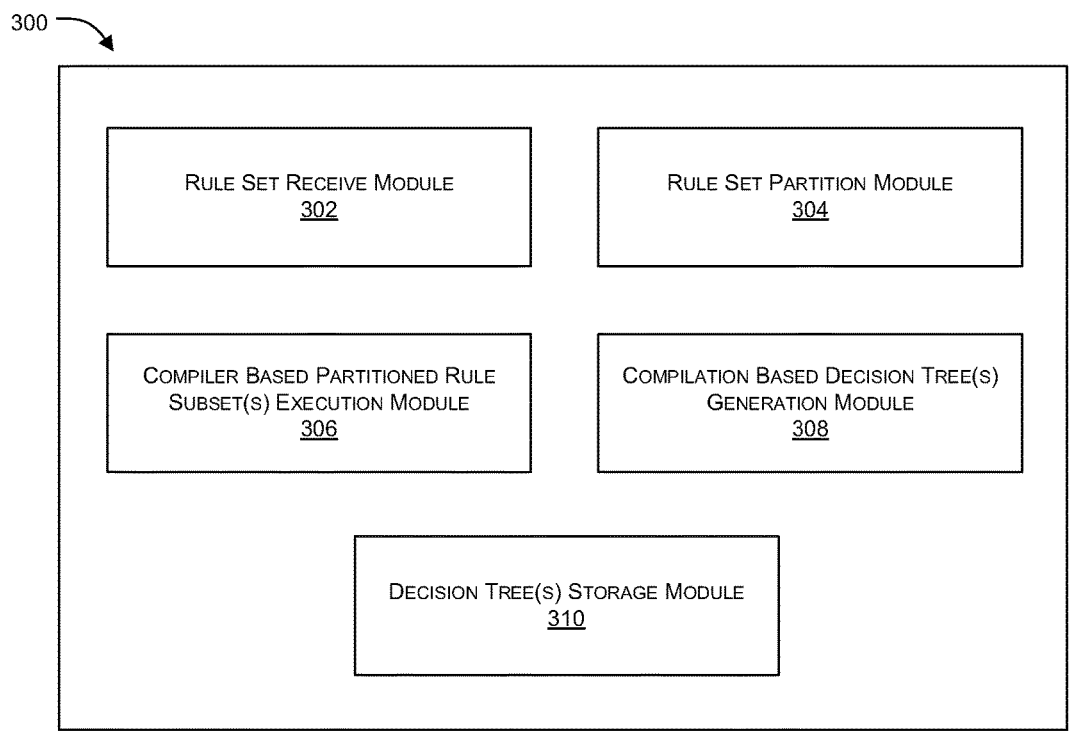
FIG. 3 illustrates exemplary functional modules of compiler-based decision tree generation system in accordance with an embodiment of the present invention.

FIG. 3 illustrates exemplary functional modules of a compiler-based decision tree generation system 300 in accordance with an embodiment of the present invention. System 300 can be configured to generate and store one or more decision trees corresponding to one or more rule subsets of a rule set. In one embodiment, compiler-based decision tree generation system 300 (e.g., compiler 104) can include a rule set receive module 302 configured to receive a rule set and a rule set partition module 304 configured to partition the rule set into one or more rule subsets. System 300 can perform both decomposition and cutting of the common ruleset to generate respective subsets, wherein the cutting of the common ruleset may be in one-dimension or multiple dimensions.

System 300 can further include a partitioned rule subset(s) execution module 306 configured to compile each rule subset, and a compilation based decision tree(s) generation module 308 configured to, based on the outcome of the compilation, generate a decision tree corresponding to each rule subset. Each decision tree can have a binary data structure including one or more nodes and one or more leaves, wherein at least one of the one or more nodes can be represented as a parent node, and the parent node can be linked to one or more children. The one or more children may represent non-leaf nodes and/or leaf nodes.

In the context of the current example, system 300 also includes a decision tree(s) storage module 310. Once one or more decision trees have been generated, they can be stored by decision tree(s) storage module 310, which is configured to store the generated decision tree(s) in a memory such as a DDR. In an aspect, the memory can store therein non-leaf nodes, leaf nodes, and rules associated with the multiple decision trees in separate portions or together but which can be retrieved independently later on during packet classification. According to one embodiment, during the traversing of the decision trees by one or more leaf or non-leaf or rule engines, the traversing action can be performed serially or in parallel.

Figure 4:
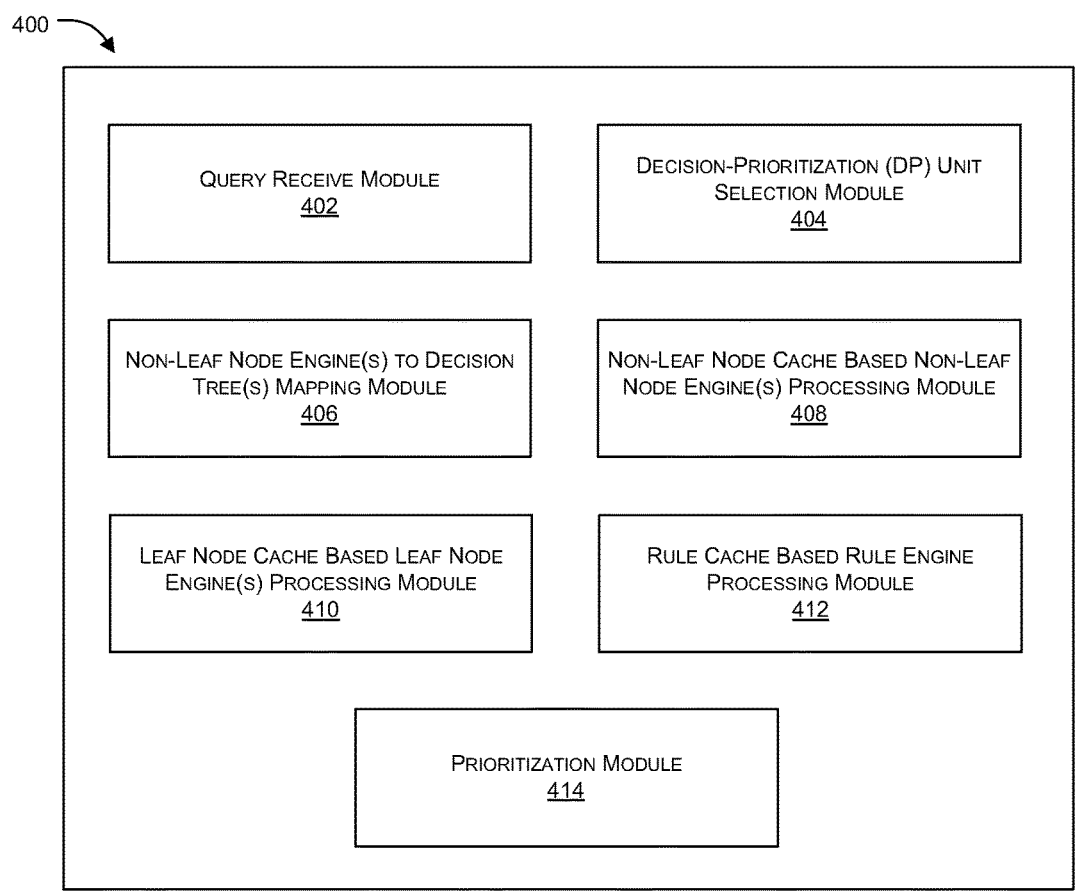
FIG. 4 illustrates exemplary functional modules of packet classification accelerator system in accordance with an embodiment of the present invention.

FIG. 4 illustrates exemplary functional modules of packet classification accelerator system 400 in accordance with an embodiment of the present invention. System 400 can include a query receive module 402 configured to receive an n-tuple (say 5-tuple) query, and a DP unit selection module 404 configured to select one of the multiple DP/PCH units. In an aspect, the DP units can be selected in a round-robin fashion. Each DP unit can include multiple non-leaf node engines, at least one leaf-node engine, and a rule engine. Optionally, the DP unit can also include a prioritization module as explained above.

System 400 can further include one or more non-leaf node engines to decision trees mapping module 406 configured to associate one or more non-leaf node engines to corresponding decision trees. For instance, when there are four non-leaf node engines and three decision trees (corresponding to three rule subsets) generated by the compiler, any three of the four non-leaf node engines can be mapped to the three decision trees so as to process the non-leaf nodes of the three decision trees. Non-leaf node cache based non-leaf node engine(s) processing module 408 of system 400 can be configured to operatively couple the one or more non-leaf node engines with a non-leaf node cache, wherein the non-leaf node cache stores a cached portion of the non-leaf nodes of the decision trees. Module 408 can further be configured to enable the non-leaf node engines to identify one or more leaf node indices based on the n-tuple input query and those of the non-leaf nodes of the corresponding decision trees.

System 400 can further include a leaf node cache based leaf node engine(s) processing module 410 configured to enable the leaf node engine of the selected DP unit to be operatively coupled with corresponding leaf-node cache, wherein the leaf-node cache stores a cached set of the leaf nodes, and wherein the leaf node engine is operable to identify one or more rule indices based on the one or more identified leaf node indices (by the non-leaf node engines) and those of the leaf nodes of the corresponding decision tree.

System 400 can further include a rule cache based rule engine processing module 412 configured to enable the rule engine of the selected DP unit to be operatively coupled with a corresponding rule cache, wherein the rule cache stores a cached set of the rules, and wherein the rule engine is operable to identify one or more matched rules based on the one or more identified rule indices (by the leaf node engine) and those of the rules of the corresponding decision tree.

System 400 can further include a prioritization module 414 configured to prioritize the one or more identified matched rule identifiers. In an aspect, the prioritization module 414 can either be configured inside the DP unit or can be configured outside the DP unit but operatively coupled thereto so that it can receive the one or more identified matched rule identifiers and prioritize them based on system/administrator configuration/preference.

Figure 5:
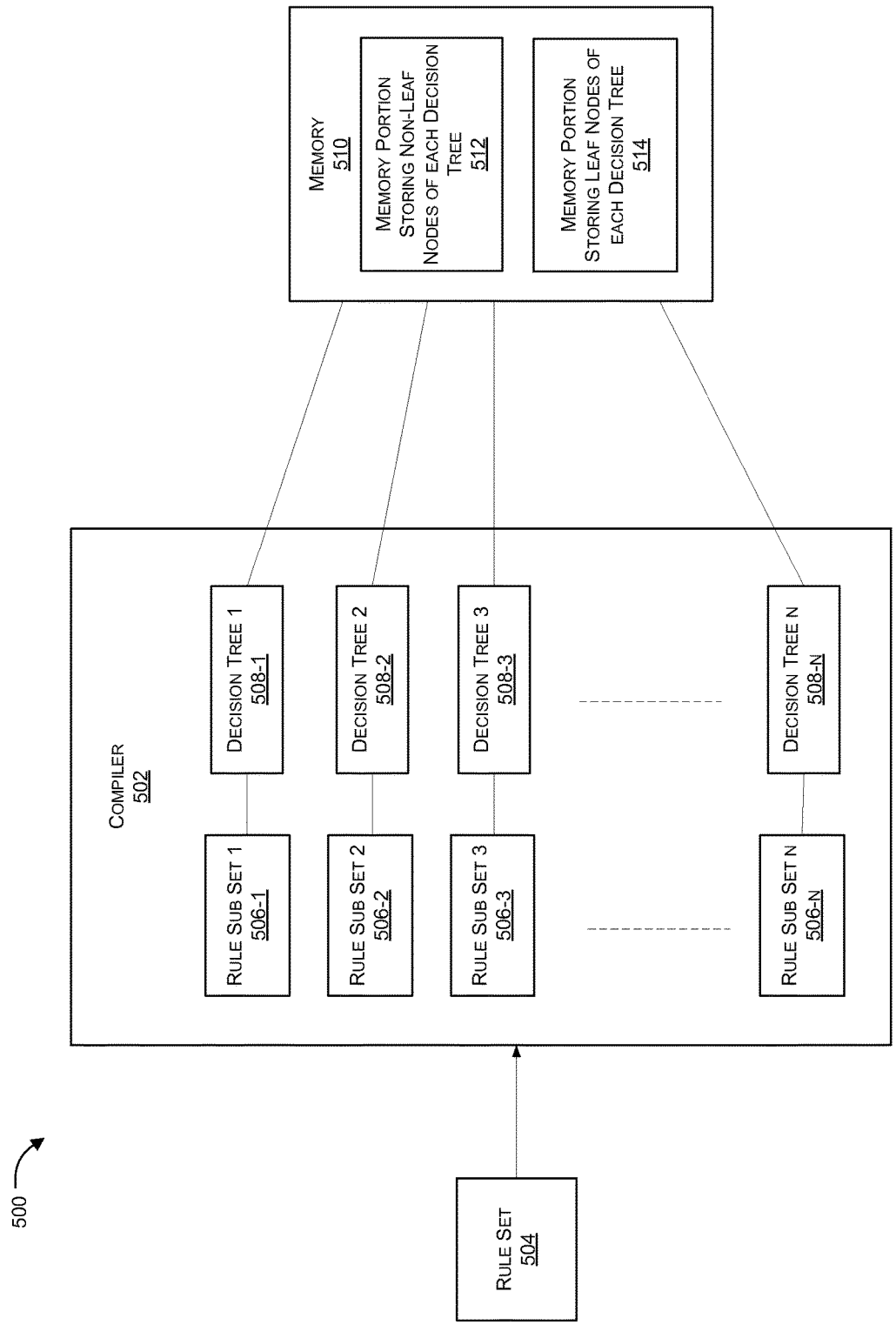
FIG. 5 illustrates an exemplary representation showing generation and storage of decision trees based on a compiler's processing of a rule set in accordance with an embodiment of the present invention.

FIG. 5 illustrates an exemplary representation 500 showing generation and storage of decision trees based on a compiler's processing of a rule set in accordance with an embodiment of the present invention. As shown and also explained with reference to FIG. 3, compiler 502 can receive a rule set 504 and can divide rule set 504 into multiple rule subsets such as 506-1, 506-2, . . . , 506-n, wherein each rule subset 506 can then be compiled to generate a corresponding decision tree such as 508-1, 508-2, . . . , 508-n, wherein each such decision tree 508 can include one or more non-leaf nodes, leaf nodes, and a root node. Each generated decision tree 508 can then be stored in a memory such as DDR memory 510 to store, for instance, non-leaf nodes of each decision tree at 512 and leaf nodes of each decision tree at 514, wherein such nodes can either be stored separately in physical clusters/segments or can be together but retrievable independently as and when desired.

Figure 6:
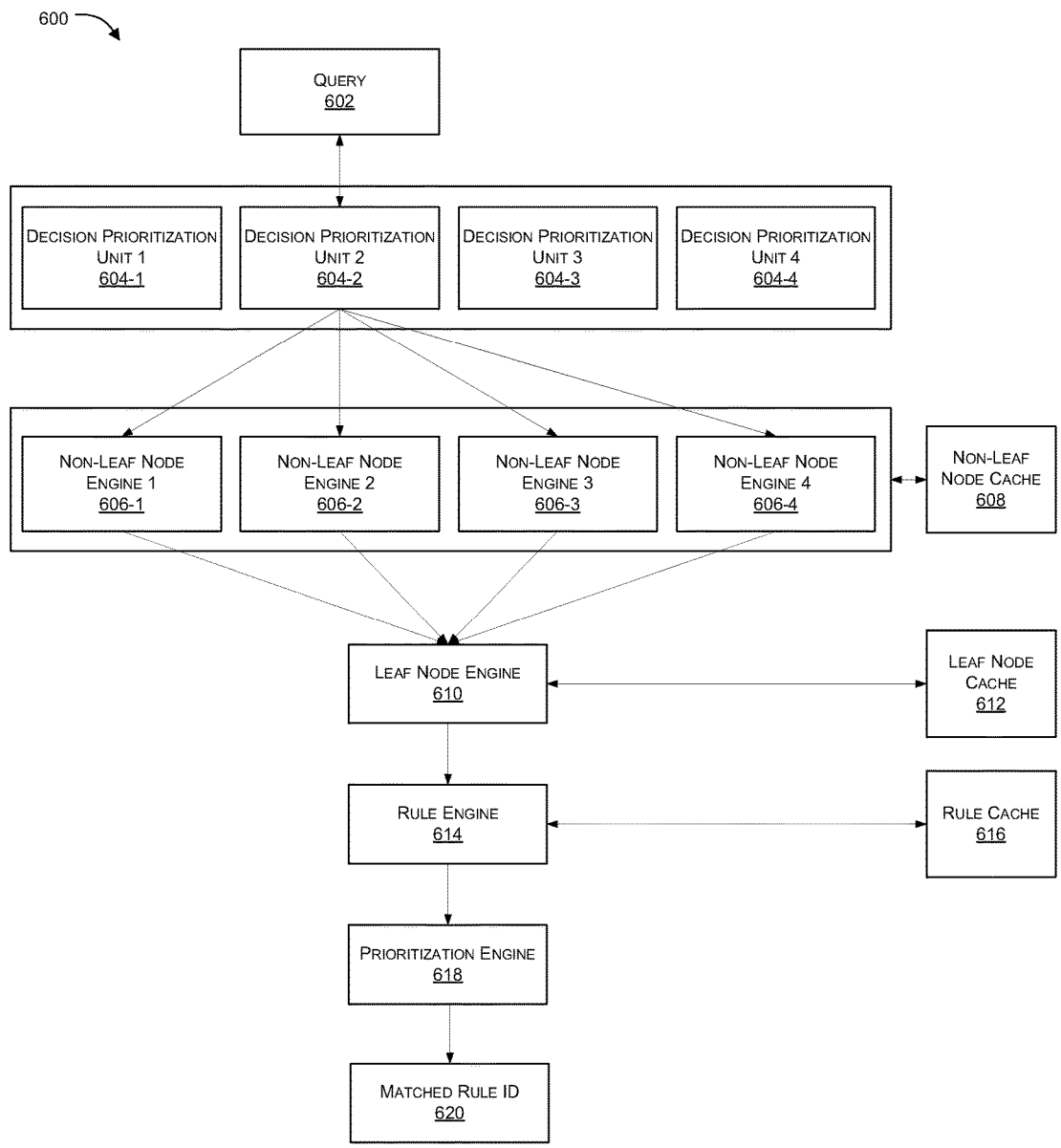
FIG. 6 illustrates an exemplary representation showing packet classification and prioritization of an input query in accordance with an embodiment of the present invention.

FIG. 6 illustrates an exemplary representation 600 showing packet classification and prioritization of an input query 602 in accordance with an embodiment of the present invention. As shown, system 600 can receive an n-tuple such as a 5-tuple query 602, for which a DP unit say 604-2 can then be selected from amongst multiple DP units 604. Each DP unit 604 can include multiple non-leaf node engines 606, which can be operatively coupled with a corresponding non-leaf node cache 608, wherein non-leaf node engines 606 are configured to identify one or more leaf node indices based on n-tuple input query 602 and those of the non-leaf nodes (received from cache 608, for example) of corresponding decision tree. Such one or more leaf node indices can then be sent to a leaf node engine 610, which can be operatively coupled with a corresponding leaf node cache 612 and configured to identify one or more rule indices based on the one or more identified leaf node indices and those of the leaf nodes of the corresponding decision tree. Such rule indices can then sent to rule engine 614, which can be operatively coupled with a corresponding rule cache 616 and configured to identify one or more matched rules based on the one or more identified rule indices and those of the rules of the corresponding decision tree. Such identified matched rules can then be sent to a prioritization engine 618 to prioritize from amongst the identified matched rules and the final set of desired matched rule identifiers can be sent to the hardware accelerator to conduct the packet classification.

Figure 7A:
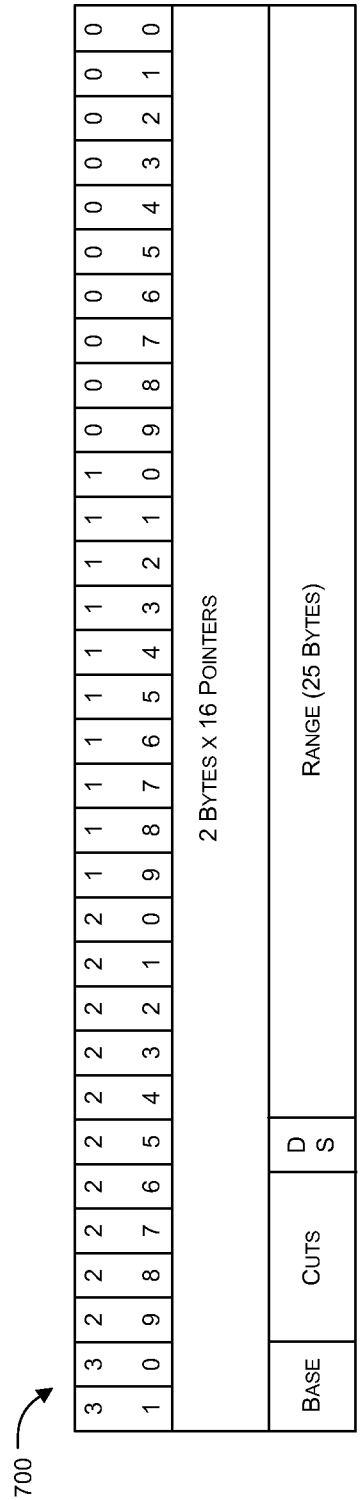
FIG. 7(a) illustrates an exemplary representation of a field format of non-leaf nodes in accordance with an embodiment of the present invention.

FIG. 7A illustrates an exemplary representation 700 of field formats of non-leaf nodes in accordance with an embodiment of the present invention. In the context of the present example, a non-leaf node's field definition includes 16 2-byte pointers, a base field, a cuts field a DS field and a range field. The DS field identifies the dimension (e.g., one or more of source address, destination address, source port, destination port and protocol) according to which the cutting has been performed. The range field identifies the range of the particular dimension (e.g., an IP address range). The cuts field identifies the number of cuts in the particular dimension. Each 2-byte pointer points to a node (a leaf node or a non-leaf node) of the decision tree corresponding to one of the identified cuts.

Figure 7B:
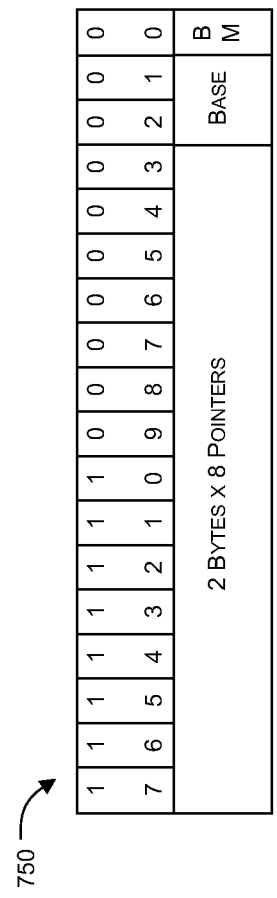
FIG. 7(b) illustrates an exemplary representation of a field format of leaf nodes in accordance with an embodiment of the present invention.

FIG. 7B illustrates an exemplary representation 750 of field formats of leaf nodes in accordance with an embodiment of the present invention. As shown, representation 750 shows leaf node's field definition having 8 2-byte pointers, a base field and a bit map (BM) field. The pointers identify one or more rule indices corresponding to the particular leaf node.

Figure 8:
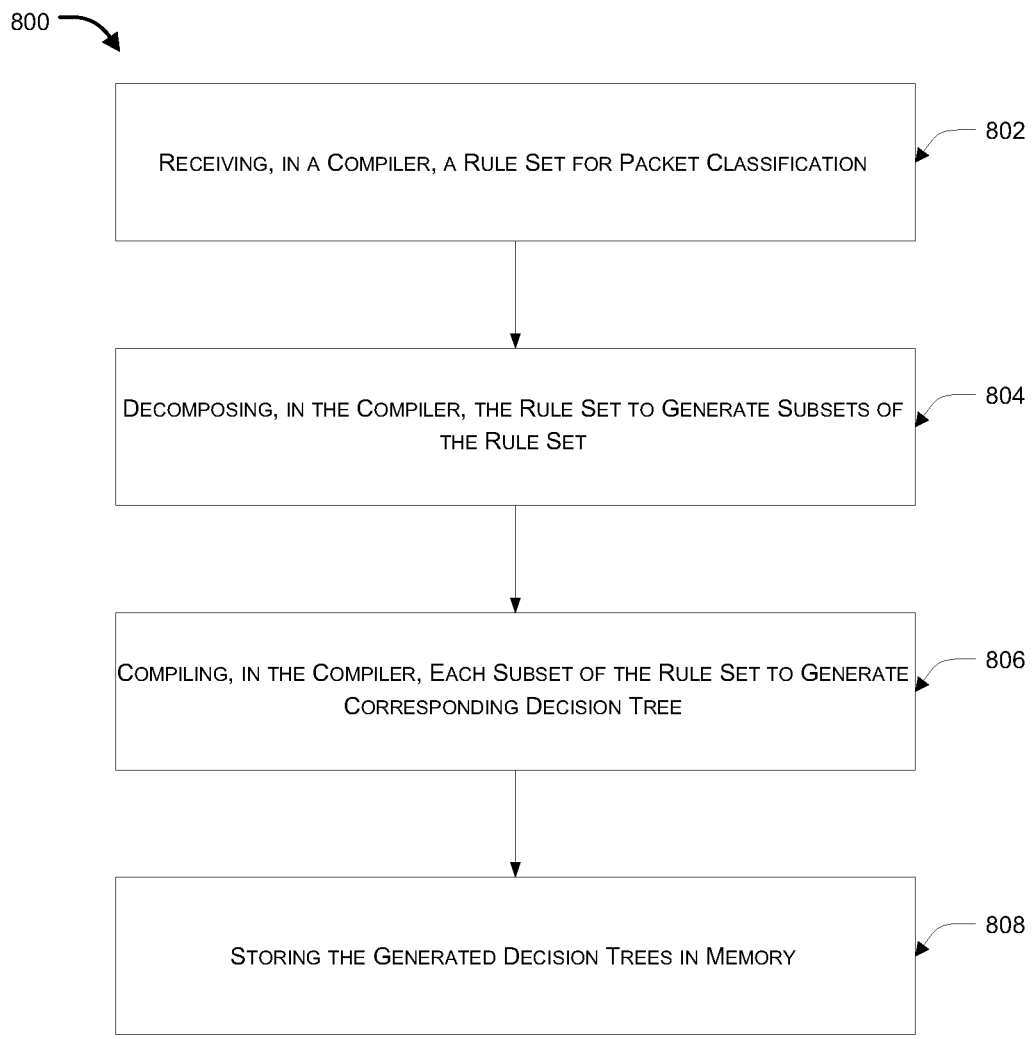
FIG. 8 illustrates an exemplary flow diagram for generation of decision trees in accordance with an embodiment of the present invention.

FIG. 8 illustrates an exemplary flow diagram 800 for generation of decision trees in accordance with an embodiment of the present disclosure. At step 802, the compiler can receive a rule set, and at step 804, divide/decompose/split the rule set into multiple rule subsets. At step 806, each rule subset can be compiled to generate a corresponding decision tree, each of which, at step 808, can be stored in a memory with indications of which nodes of the decision trees are non-leaf nodes and those that are leaf nodes.

Figure 9:
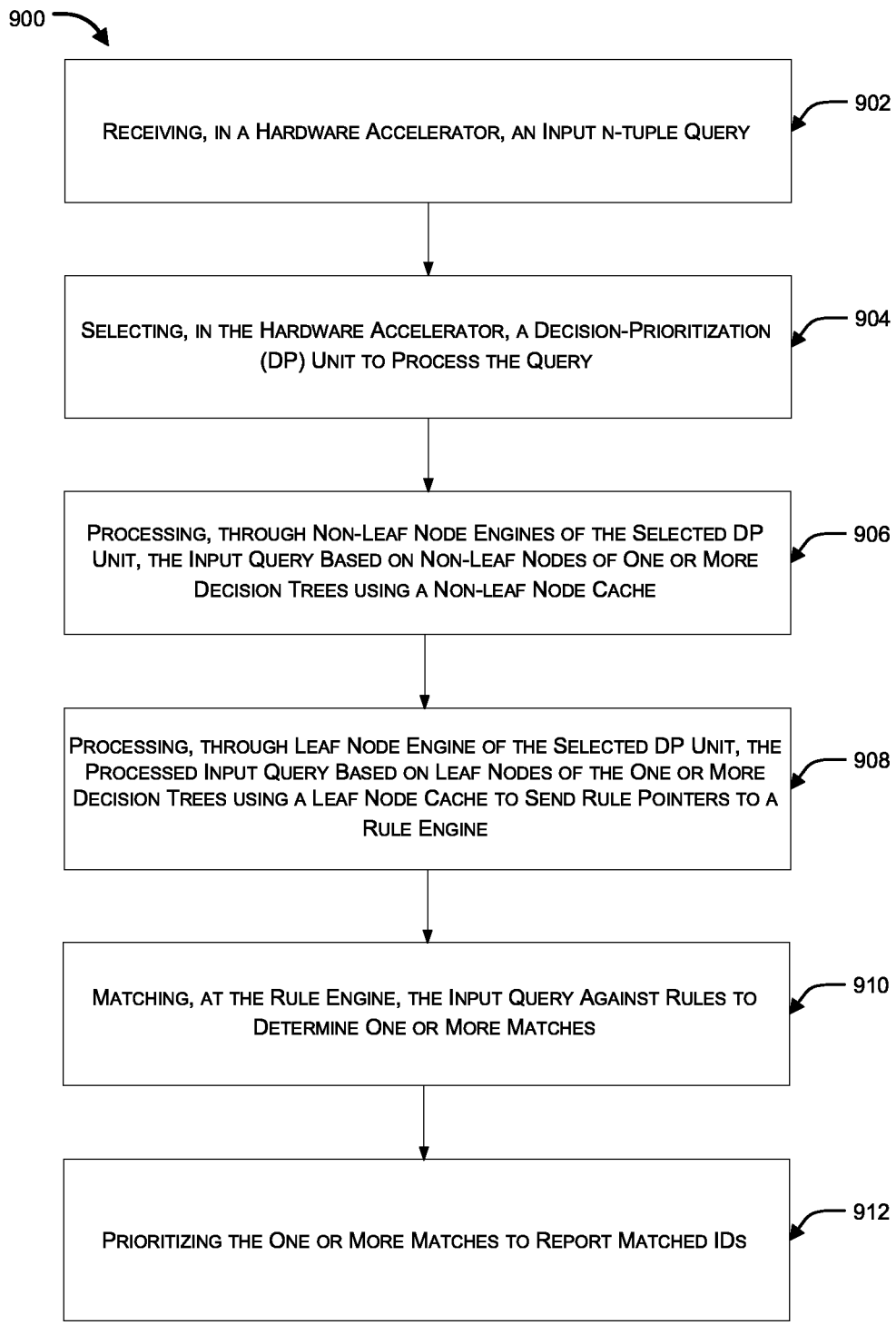
FIG. 9 illustrates an exemplary flow diagram for packet classification and prioritization of an input query in accordance with an embodiment of the present invention.

FIG. 9 illustrates an exemplary flow diagram 900 for packet classification and prioritization of an input query in accordance with an embodiment of the present invention. At step 902, a hardware accelerator receives an input query, and at 904, a DP unit from among multiple DP units can be selected, say in a round-robin fashion. At step 906, non-leaf node engines of the selected DP unit that are operatively coupled with a non-leaf node cache can identify one or more leaf node indices based on an n-tuple input query and those of the non-leaf nodes of the corresponding decision tree. At step 908, leaf node engine of the selected DP unit that is operatively coupled with a leaf node cache can identify one or more rule indices based on the one or more identified leaf node indices and those of the leaf nodes of the corresponding decision tree. At step 910, a rule engine of the selected DP unit that is operatively coupled with a rule cache can identify one or more matched rules based on the one or more identified rule indices and those of the rules of the corresponding decision tree. At step 912, the matched rules can be optionally prioritized and sent out for packet classification based on the prioritized matched rule identifiers.

Figure 10:
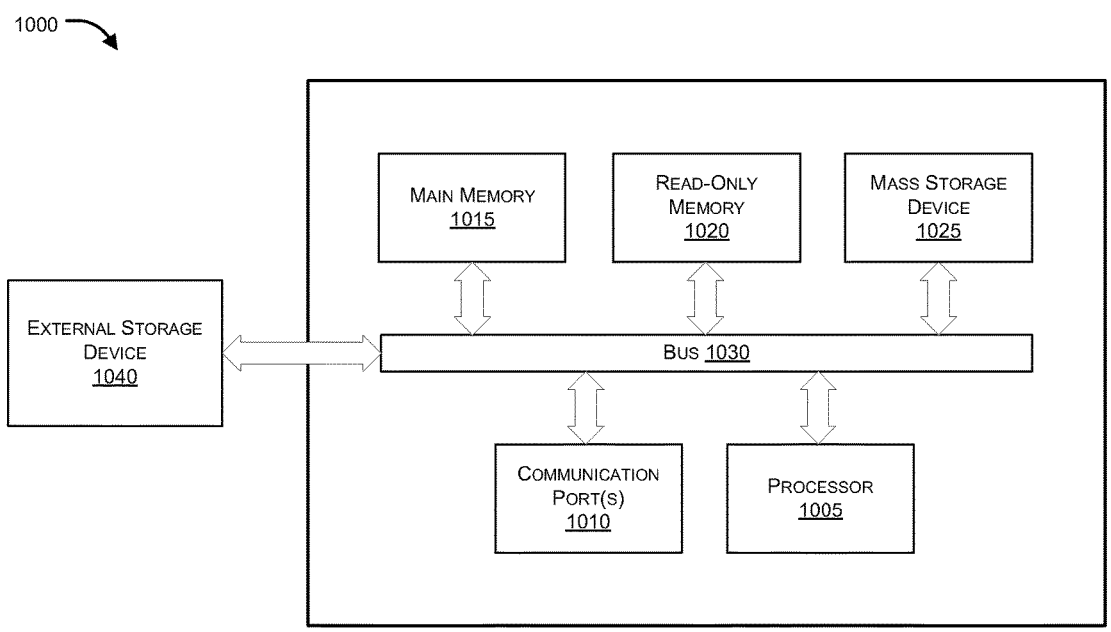
FIG. 10 illustrates an exemplary computer system in which or with which embodiments of the present invention may be utilized.

FIG. 10 is an example of a computer system 1000 with which embodiments of the present disclosure may be utilized. Computer system 1000 may represent or form a part of a network device, a server or a client workstation. Embodiments of the present disclosure include various steps, which will be described in more detail below. A variety of these steps may be performed by hardware components or may be tangibly embodied on a computer-readable storage medium in the form of machine-executable instructions, which may be used to cause a general-purpose or special-purpose processor programmed with instructions to perform these steps. Alternatively, the steps may be performed by a combination of hardware, software, and/or firmware.

As shown, computer system 1000 includes a bus 1030, a processor 1005, communication port 1010, a main memory 1015, a removable storage media 1040, a read only memory 1020 and a mass storage 1025. A person skilled in the art will appreciate that computer system 1000 may include more than one processor and communication ports.

Examples of processor 1005 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 1005 may include various modules associated with embodiments of the present invention.

Communication port 1010 can be any of an RS-232 port for use with a modem based dialup connection, a 10/100 Ethernet port, a Gigabit or 10 Gigabit port using copper or fiber, a serial port, a parallel port, or other existing or future ports. Communication port 1010 may be chosen depending on a network, such a Local Area Network (LAN), Wide Area Network (WAN), or any network to which computer system 1000 connects.

Memory 1015 can be Random Access Memory (RAM), or any other dynamic storage device commonly known in the art. Read only memory 1020 can be any static storage device(s) such as, but not limited to, a Programmable Read Only Memory (PROM) chips for storing static information such as start-up or BIOS instructions for processor 1005.

Mass storage 1025 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), such as those available from Seagate (e.g., the Seagate Barracuda 7200 family) or Hitachi (e.g., the Hitachi Deskstar 7K1000), one or more optical discs, Redundant Array of Independent Disks (RAID) storage, such as an array of disks (e.g., SATA arrays), available from various vendors including Dot Hill Systems Corp., LaCie, Nexsan Technologies, Inc. and Enhance Technology, Inc.

Bus 1030 communicatively couples processor(s) 1005 with the other memory, storage and communication blocks. Bus 1030 can be, such as a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 1005 to system memory.

Optionally, operator and administrative interfaces, such as a display, keyboard, and a cursor control device, may also be coupled to bus 1030 to support direct operator interaction with computer system 1000. Other operator and administrative interfaces can be provided through network connections connected through communication port 1010.

Removable storage media 1040 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM).

Components described above are meant only to exemplify various possibilities. In no way should the aforementioned exemplary computer system limit the scope of the present disclosure.

While embodiments of the present invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claim.

In the foregoing description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, to avoid obscuring the present invention.

Some portions of the detailed description have been presented in terms of algorithms and symbolic representations of operations on data bits within a computer memory. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "computing", "comparing", "determining", "adjusting", "applying", "creating", "ranking," "classifying," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Certain embodiments of the present invention also relate to an apparatus for performing the operations herein. This apparatus may be constructed for the intended purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Many other embodiments will be apparent to those of skill in the art upon reading and understanding the above description. The scope of the invention should therefore be determined with reference to the appended claims, along with the full scope of equivalents to which such claims are entitled.

What is claimed is:

1. A packet classification hardware accelerator system comprising:
    a plurality of packet classification hardware units each capable of operation in parallel on a corresponding decision tree of a plurality of decision trees, wherein the plurality of decision trees are derived from respective subsets of a common ruleset defining packet classification rules based on header fields of packets;
    a memory having stored therein non-leaf nodes, leaf nodes and rules associated with the plurality of decision trees;
    a cache subsystem, coupled in communication with the plurality of packet classification hardware units and the memory, having stored therein (i) a cached portion of the non-leaf nodes distributed among a plurality of non-leaf node caches, (ii) a cached set of the leaf nodes in a leaf node cache and (iii) a cached set of the rules;
    a level-two (L2) cache shared among the plurality of non-leaf node caches;
    wherein a compiler marks each of the non-leaf nodes as either hot or cold; and
    wherein only those of the non-leaf nodes marked as hot can be cached in the L2 cache.

2. The system of claim 1, wherein each of the plurality of packet classification hardware units comprises:
    a plurality of non-leaf node engines operable to identify one or more leaf node indices based on an n-tuple input query and those of the non-leaf nodes of the corresponding decision tree;
    a leaf node engine operable to identify one or more rule indices based on the one or more identified leaf node indices and those of the leaf nodes of the corresponding decision tree; and
    a rule engine operable to identify one or more matched rules based on the one or more identified rule indices and those of the rules of the corresponding decision tree.

3. The system of claim 1, wherein those of the non-leaf nodes marked as cold are evicted from the leaf node cache and the L2 cache before those of the non-leaf nodes marked as hot.

4. The system of claim 1, wherein the compiler performs both decomposition and cutting of the common ruleset to generate the respective subsets and wherein said cutting of the common ruleset may be in one-dimension or multiple dimensions.

5. The system of claim 2, further comprising a prioritization module configured to prioritize the one or more identified matched rules.

6. The system of claim 1, wherein pipelined processing of one or more input n-tuple queries is facilitated by decoupling of the plurality of packet classification hardware units and the cache subsystem.

7. The system of claim 1, wherein each of the plurality of decision trees are traversed in parallel.

8. The system of claim 1, wherein each of the plurality of decision trees are traversed serially.

9. The system of claim 1, wherein the plurality of packet classification hardware units and the cache subsystem are implemented within one or more of an Application Specific Integrated Circuit (ASIC) and a Field-Programmable Gate Array (FPGA).

10. The system of claim 9, wherein the memory comprises an off-chip Double Data Rate (DDR) Synchronous Dynamic Random Access Memory (SDRAM).

* * * * *